(12) United States Patent
Menard et al.

(10) Patent No.: US 7,862,317 B2
(45) Date of Patent: Jan. 4, 2011

(54) MOLD FOR VULCANIZING A TIRE, A METHOD OF VULCANIZING A GREEN TIRE BLANK, AND A TIRE OBTAINED BY SAID METHOD

(75) Inventors: Gilbert Menard, Volvic (FR); Adrien Mondolo, Clermont-Ferrand (FR); Jean-Charles Ferrand, Riom (FR); Gérard Alegre, Clermont-Ferrand (FR); Jean-Claude Aperce, Pont-du-Chateau (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 156 days.

(21) Appl. No.: 11/982,503

(22) Filed: Nov. 1, 2007

(65) Prior Publication Data

US 2008/0178990 A1    Jul. 31, 2008

Related U.S. Application Data

(60) Provisional application No. 60/881,074, filed on Jan. 18, 2007.

(30) Foreign Application Priority Data

Nov. 2, 2006   (FR) .................................. 06 54700

(51) Int. Cl.
   *B29C 35/00*       (2006.01)
   *B29D 30/00*       (2006.01)
(52) U.S. Cl. .................. 425/47; 425/39; 425/DIG. 129; 249/204; 292/299; 292/342; 49/463; 264/501

(58) Field of Classification Search ................... 425/47, 425/46, DIG. 129, 451.4, 451.7, 451.6, 195, 425/57, 56; 264/326, 36.14, 500, 501, 328.3; 29/525.03; 292/299, 261, 342, 343, 288, 292/256.6, 256, 256.63; 49/466, 465, 463; 249/57, 204; *B29C 33/20, 33/22, 33/24*
See application file for complete search history.

(56) References Cited

U.S. PATENT DOCUMENTS

| 1,542,798 | A | * | 6/1925 | Midgley | ....................... | 425/47 |
| 1,851,570 | A | * | 3/1932 | De Mattia | ..................... | 425/47 |
| 2,334,448 | A | * | 11/1943 | Sheridan | ..................... | 220/301 |
| 3,479,693 | A | * | 11/1969 | Cantarutti | .................... | 425/40 |

(Continued)

FOREIGN PATENT DOCUMENTS

EP          0 436 495 A1       7/1991

*Primary Examiner*—Richard Crispino
*Assistant Examiner*—William P Bell
(74) *Attorney, Agent, or Firm*—Cohen Pontani Lieberman & Pavane LLP

(57) ABSTRACT

A mold includes at least one axial member carrying at least one sidewall molding surface for molding a sidewall of a tire, radial segments each carrying at least one surface for molding a tread of the tire and locking surfaces for connecting the axial member with the radial segments. First radial and axial locking surfaces which are displaceable and carried by the axial member cooperate with second radial and axial locking surfaces. The sidewall molding surface is integral with a fixed portion of the axial member. The first radial and axial locking surfaces are integral with at least one locking member mounted in the axial member and are movable relative to the fixed portion.

11 Claims, 4 Drawing Sheets

U.S. PATENT DOCUMENTS 3,741,696 A * 6/1973 Greenwood .................. 425/47
3,825,396 A * 7/1974 Kontz ......................... 425/541
6,382,943 B1 * 5/2002 Metz et al. .................... 425/46
2003/0127579 A1 * 7/2003 Olexovitch .................. 248/534
2004/0207116 A1 * 10/2004 Girard et al. ................ 264/326

* cited by examiner

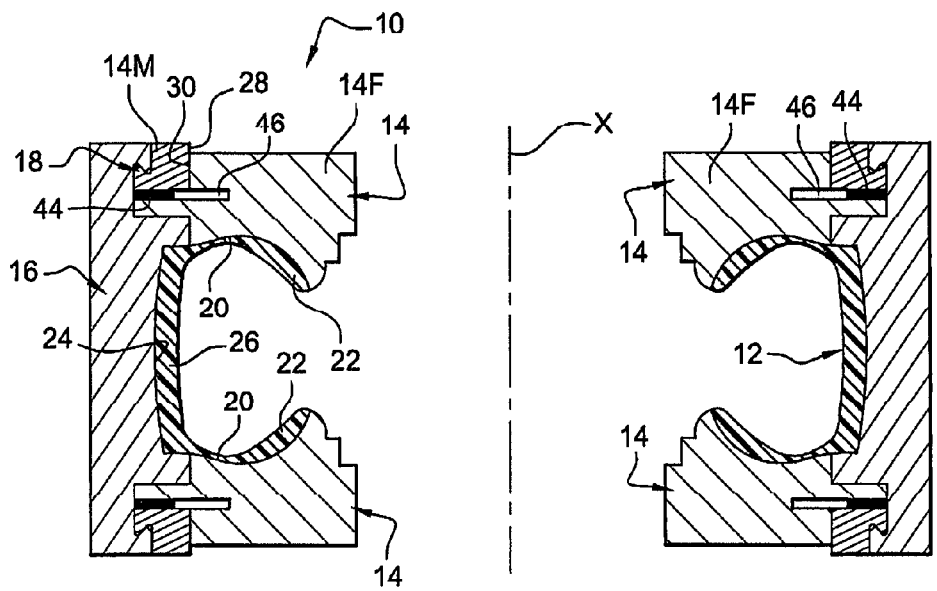
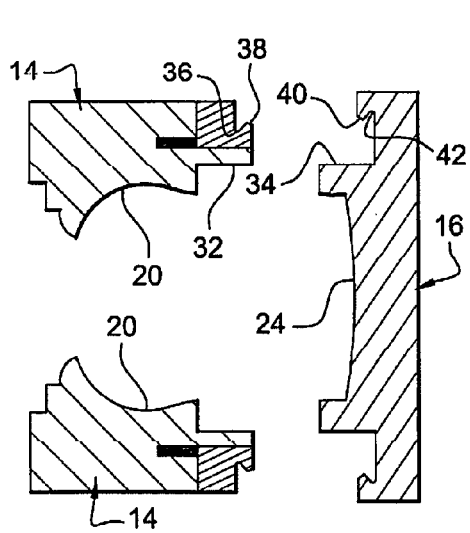
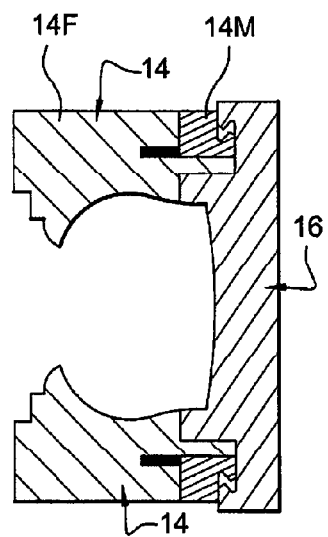
Fig. 1
Fig. 2
Fig. 3

MOLD FOR VULCANIZING A TIRE, A METHOD OF VULCANIZING A GREEN TIRE BLANK, AND A TIRE OBTAINED BY SAID METHOD

RELATED APPLICATIONS

This application claims priority from U.S. Provisional Patent Application Ser. No. 60/881,074 filed Jan. 18, 2007 and French application no. 06/54700 filed Nov. 2, 2006, the entire content of both of which is hereby incorporated by reference.

FIELD OF THE INVENTION

The present invention relates to a mold for vulcanizing a tire, to a method of vulcanizing a green tire blank and to a tire obtained by said method.

BACKGROUND OF THE INVENTION

In the present text, reference to the "axis" of a tire is a reference to its axis of revolution. Said axis defines an axial direction of the mold assuming that the tire is in the mold.

Fabricating a tire by vulcanizing a green tire blank is known. To this end, the blank is placed in a mold of the type comprising:
- at least one axial member carrying at least one surface for molding a sidewall of a tire;
- radial segments each carrying at least one surface for molding a tire tread; and
- means for connecting the axial member with the radial segments, comprising first radial and axial locking surfaces carried by the axial member which can cooperate with second radial and axial locking surfaces, which are complementary to the first locking surfaces, carried by each radial segment, the first and second locking surfaces being displaceable relative to each other, between:
  - an open position of the mold in which the complementary locking surfaces are separated; and
  - a closed position of the mold in which the complementary locking surfaces cooperate with each other.

A mold of said type comprises first and second axial members respectively carrying surfaces for molding the first and second tire sidewalls and is described, for example, in European patent EP-A1-0 436 495.

Normally, in order to vulcanize a green tire blank, said blank is placed in a mold of the above-mentioned type in the following manner.

Initially, the blank is placed in contact with the axial members, then each axial member is connected with the radial segments, in particular by axially displacing the first and second locking surfaces relative to each other between the open and closed positions of the mold.

Generally, in a conventional mold, the green blank is pressed against the molding surfaces of the axial members and radial segments of the mold using a pressurized flexible membrane cooperating with the inner surface of the blank. In the mold disclosed in EP-A1-0 436 495, the pressure of the membrane, which is necessary in order to mold a tire, also has the effect of stressing the complementary locking surfaces in their cooperation position, and thus keeping the mold closed. Since the molding pressure participates in locking the mold closed, the conventional mold is said to be self-locking.

However, in a mold of the above-mentioned type, the sidewall molding surfaces, carried by the first and second axial members, are integral with the first radial and axial locking surfaces, also carried by the first and second axial members. For this reason, axial displacement of the first and second locking surfaces relative to each other when closing and opening the mold causes relative displacement between the sidewall molding surfaces which are integral with the first locking surfaces and the surfaces for molding the tread carried by the radial segments. Said relative displacement causes the formation of an unwanted impression on each sidewall of the blank before it is vulcanized, by plastic deformation of said sidewall.

OBJECTS AND SUMMARY OF THE INVENTION

The aim of the invention is to avoid the formation of unwanted impressions on the sidewalls of said blank before vulcanizing the green blank.

To this end, the invention provides a mold of the type comprising:
- at least one axial member carrying at least one surface for molding a sidewall of a tire;
- radial segments each carrying at least one surface for molding a tire tread;
- means for connecting the axial member with the radial segments, comprising first radial and axial locking surfaces carried by the axial member which can cooperate with second radial and axial locking surfaces, which are complementary to the first locking surfaces, carried by each radial segment, the first and second locking surfaces being displaceable relative to each other, between:
  - an open position of the mold in which the complementary locking surfaces are separated; and
  - a closed position of the mold in which the complementary locking surfaces cooperate with each other;
  wherein each sidewall molding surface integral with a fixed portion of the axial member, the first locking surfaces being integral with at least one locking member mounted in the axial member and being movable relative to the fixed portion.

Since the first locking surfaces are movable relative to each sidewall molding surface, when closing of the mold, displacement of said first locking surfaces does not cause displacement of the sidewall molding surface and does not cause the formation of an impression on the green blank.

In a further, optional characteristic of the mold of the invention, the locking member is mounted in the axial member to be axially displaceable relative to the fixed portion between the open and closed positions of the mold.

Preferably, the first radial and axial locking surfaces are formed by annular grooves and ribs provided in the locking member, and the second radial and axial locking surfaces are formed by annular groove segments and rib segments provided in each radial segment.

Said grooves and ribs, which are easy to produce, cooperate effectively with one another so as to lock each axial member radially and axially with the radial segments.

In a further, optional, characteristic of the mold of the invention, the axial member includes at least one member for wedging the locking member in the closed position of the mold.

Thus, by preventing the locking member from returning to the open position of the mold when vulcanizing the tire, the wedging member holds the complementary locking surfaces in their cooperating position and thus keeps the mold closed.

In accordance with a further optional characteristic of the mold of the invention, the wedging member is radially displaceably mounted in a housing provided in the fixed position of the axial member, between:
- a retracted position in the housing; and
- a wedged position in which the wedging member is inserted between an axial surface of the fixed portion, extending said housing, and an axial end surface of the locking member.

The retracted position of the wedging member allows axial displacement of the locking member between its mold open and closed positions. The wedging position of the wedging member prevents the locking member from returning to the open position of the mold, thus keeping the mold closed.

In accordance with a further optional characteristic of the mold of the invention, the wedging member is radially displaceably mounted on an outer axial end surface of the fixed portion of the axial member, between:
- a disengaged position of the locking member; and
- a wedging position in which the wedging member is inserted between said outer surface and an axial surface to wedge the locking member.

Said wedging member is readily accessible from the outside of the mold. In the disengaged position, the wedging member may be separated from the mold and allows axial displacement of the locking member between its mold open and closed positions.

In accordance with a further optional characteristic of the mold of the invention, the wedging member has the general form of a ring which is coaxial with the tire, the locking member comprising axial projections which are circumferentially distributed, alternating with axial indentations, the wedging member comprising projections and indentations which are complementary with the projections and indentations of the locking member, the locking member and the wedging member being movable relative to each other between:
- a position in which the projections of the locking member and the wedging member are axially superimposed; and
- a position in which the projections of the locking member and the wedging member are fitted into complementary indentations of the wedging member and locking member respectively.

By these means, the thickness of the assembly formed by the locking member and wedging member varies so that when the projections are axially superimposed, the mold is in the closed position.

According to another optional characteristic of the mold of the invention, the locking member is mounted in the axial member to be displaceable in rotation relative to the fixed portion between the open and closed positions of the mold.

Preferably, the first locking surfaces are designed to co-operate with the second locking surfaces in compliance with a bayonet type connection,
- the first radial and axial locking surfaces being formed by an annular surface formed in the locking member, provided with axial projections that are circumferentially distributed over a radially outer portion of said annular surface;
- the second radial and axial locking surfaces being formed by annular surface segments each provided in a corresponding radial segment, each annular surface segment being provided with axial projections distributed circumferentially over a radially inner portion of the annular surface segment; and
- the projections alternating with indentations.

Such locking surfaces for co-operating with one another producing a bayonet type connection occupy little space axially and do not require an additional wedging member.

According to another optional characteristic of the mold of the invention, the locking member has the general form of a ring that is coaxial with the tire, assuming that the tire is in the mold.

Such a locking member is easy to guide axially or in rotation over the stationary portion of the axial member.

In accordance with another optional characteristic of the mold of the invention, said mold comprises first and second axial members respectively carrying surfaces for molding the first and second tire sidewalls, the first locking surfaces being integral with at least one locking member mounted in each axial member and being movable relative to the fixed portion of said axial member.

The invention also provides a method of vulcanizing a green tire blank using a mold comprising:
- at least one axial member carrying at least one surface for molding a sidewall of a tire;
- radial segments carrying at least one surface for molding a tread of a tire;
- means for connecting the axial member with the radial segments;

the method being of the type in which:
- the green blank is placed in contact with the axial member; then
- said axial member is connected with the radial segments using the connection means;

wherein since the mold is as defined above, the axial member is connected with the radial segments using connection means by displacing the first and second locking surfaces relative to each other from an open position towards a closed position of the mold, while keeping the axial position of the fixed portion of the axial member constant relative to the radial segments.

Since the axial position of the fixed portion of the axial member relative to the radial segments remains constant during axial displacement of the first and second locking surfaces relative to each other, there is no relative displacement between each sidewall molding surface integral with the fixed portion of the axial member and each tread molding surface carried by the radial segments. Thus, no unwanted impressions are formed on the sidewalls of the green tire blank.

In accordance with another optional characteristic of the method of the invention, with the mold as described above, after having axially displaced the first and second locking surfaces relative to each other from the open position towards the closed position of the mold, the locking member is wedged in the closed position of the mold by radial displacement of the wedging member.

Like the pressure of the membrane in a conventional mold, the wedging member can stress the complementary locking surfaces into their cooperation position and thus keep the mold closed.

The invention also provides a tire, the tire being obtained by a method as defined above.

BRIEF DESCRIPTION OF THE DRAWINGS

The invention will be better understood from the following description made solely by way of non-limiting example made with reference to the accompanying drawings, in which:

FIG. 1 is an axial section of a mold in accordance with a first embodiment of the invention;

FIGS. 2 to 4 are half views analogous to FIG. 1, showing the mold at different stages of closing;

MORE DETAILED DESCRIPTION

Figure 4:
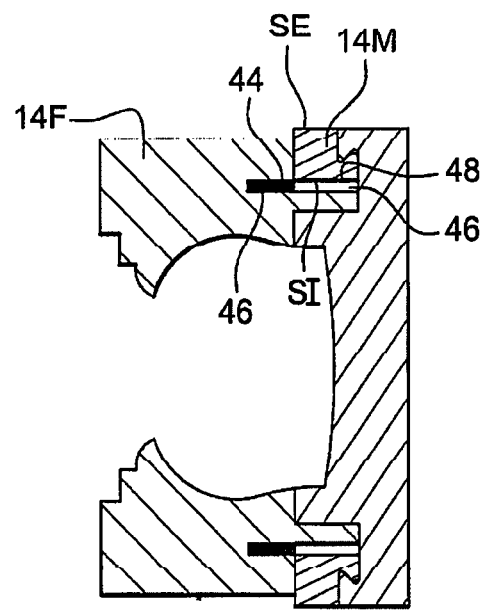

FIGS. 1 to 4 show a mold in a first embodiment of the invention, denoted by the general reference numeral 10. Said mold 10 is intended for vulcanizing a blank to obtain a tire 12 which is shown only in FIG. 1.

In the example described, the mold 10 is generally a body of revolution about an axis X which coincides with the axis of revolution of the tire 12 when the tire is housed in the mold 10, as shown in FIG. 1.

The mold includes first and second axial members 14, radial segments 16 and means 18 for connecting each axial member 14 with the radial segments 16.

Each axial member 14 is generally a body of revolution and carries a surface of revolution 20 to mold a corresponding sidewall 22 of the tire. The radial segments 16 each carry a segment of a surface of revolution 24 to mold a tread 26 of the tire 12.

Each axial member 14 comprises a fixed portion 14F termed a shell and a portion 14M, termed the movable portion, which is axially movably mounted relative to the fixed portion 14F.

In the example described, the movable portion 14M is in the general shape of a ring which is coaxial with the tire 12 assuming that the tire 12 is in the mold 10. The movable portion 14M is axially defined by the first, SI, and second, SE, end surfaces (see FIG. 4). The movable portion 14M is axially guided relative to the fixed portion 14F by means of complementary cylindrical axial guiding surfaces 28, 30, allowing axial displacement of the movable portion 14M relative to the fixed portion by sliding.

It should be noted that the sidewall molding surface 20 of each axial member 14 is integral with the fixed portion 14F of said member 14.

The fixed portion 14F of each axial member 14 includes a shoulder 32 which can cooperate with a complementary shoulder 34 of each radial segment 16. Said complementary shoulders 32, 34 form complementary surfaces for axially bearing and mutually radially guiding the axial member 14 with each radial segment 16.

The connection means 18 comprise first radial and axial locking surfaces formed by annular grooves 36 and ribs 38 (see FIG. 2) provided in the movable portion 14M of the axial member. The first locking surfaces 36, 38 are thus integral with the movable portion 14M, the movable portion forming a locking member.

The annular grooves 36 and ribs 38 cooperate with complementary annular groove 40 and rib 42 segments formed in each radial segment 16 to radially and axially lock each axial member 14 with the radial segments 16.

The first locking surfaces 36, 38 carried by each axial member 14 can thus cooperate with second radial and axial locking surfaces which are complementary to said first locking surfaces, formed by the annular groove 40 and rib 42 segments integral with each radial segment 16.

Thus, the first 36, 38 and second 40, 42 locking surfaces are axially displaceable relative to each other between:
  an open position of the mold, as shown in FIGS. 2 and 3, in which the complementary locking surfaces 36 to 42 are separated; and
  a closed position of the mold, as shown in FIGS. 1 and 4, in which the complementary locking surfaces 36 to 42 cooperate with each other.

The movable portion 14M and the first locking surfaces 36, 38 carried by said movable portion 14M can thus be axially displaced between the open and closed positions of the mold respectively shown in FIGS. 2 and 3 and in FIGS. 1 and 4.

Each axial member 14 comprises at least one member 44 for wedging the movable portion 14M in the closed position of the mold, as shown in FIG. 1.

In the first embodiment of the invention shown in FIGS. 1 to 4, the wedging member 44 is radially displaceably mounted in a housing 46 provided in the fixed portion 14F of the axial member 14, between:
  a retracted position in the housing 46, as shown in FIGS. 2 to 4; and
  a wedging position as shown in FIG. 1.

In the wedging position, the wedging member 44 is inserted between an axial surface 48 of the fixed portion 14F, extending the housing 46, and the axial end surface SI of the movable portion 14M.

The principal aspects of a method of vulcanizing a green tire blank using a mold 10 in accordance with the first embodiment of the invention will now be described.

Firstly, the green tire blank is placed between the two axial members 14 of the mold 10 so that said blank is in contact with said axial members 14, while the radial segments 16 are radially spaced from the axial members 14, as shown in FIG. 2.

Next, while each wedging member 46 is in the retracted position in the housing 46 and each movable portion 14M is in the open position of the mold 10, the radial segments 16 are moved radially closer to the axial members 14 into the position shown in FIG. 3. On moving, the complementary shoulders 32, 34 participate in mutually radially guiding each axial member 14 with each radial segment 16.

Next, the movable portion 14M of each axial member 14 is axially displaced towards the closed position of the mold 10 as shown in FIG. 4, using conventional means.

This has the effect of axially displacing the first 36, 38 and second 40, 42 locking surfaces relative to each other, from the open position towards the closed position of the mold 10 and, as a result, connecting the axial member 14 to the radial segments 16.

It should be noted that the relative axial displacement of the first 36, 38 and second 40, 42 locking surfaces is carried out while keeping the axial position of the fixed portion 14F of each axial member 14 constant relative to the radial segments 16.

Finally, the movable portion 14M of each axial member 14 is wedged in the closed position of the mold 10 by radial displacement of the wedging member 46 from its retracted position towards its wedging position shown in FIG. 1.

Figure 5:
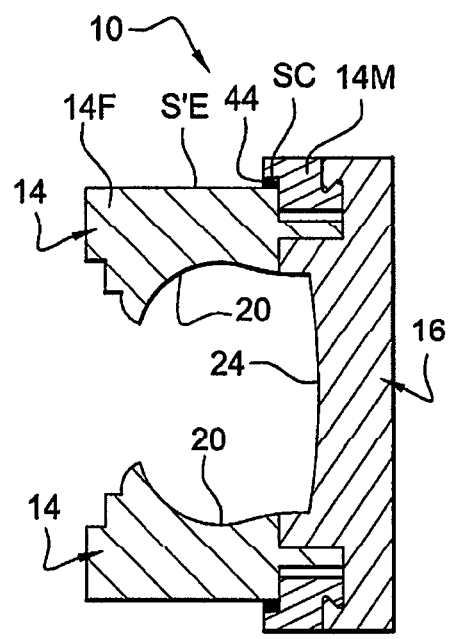
FIG. 5 is an axial sectional half view of a mold in accordance with a second embodiment of the invention.

FIG. 5 shows a mold in accordance with a, second embodiment of the invention. In FIG. 5, elements analogous to those shown in FIGS. 1 to 4 are denoted by identical reference numerals.

In this embodiment, the vulcanizing member 44 is radially displaceably mounted on an axial outer end surface S'E of the fixed portion 14F of the axial member 14, between:

a disengaged position of the movable portion 14M forming the locking member; and a wedging position as shown in FIG. 5, in which the wedging member 44 is inserted between said outer surface S'E and a radially inner shoulder of the movable portion 14M forming an axial wedging surface SC on said movable portion 14M.

The wedging member may have the general form of a segmented ring coaxial with the axis X of the mold.

The principal aspects of a method of vulcanizing a green tire blank using a mold 10 in accordance with the second implementation of the invention can be deduced mutatis mutandis from the method described above with the mold 10 in accordance with the first implementation of the invention.

Figure 6:
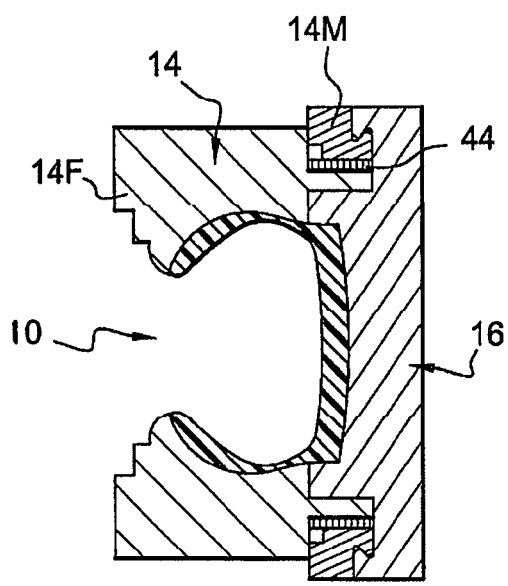
FIG. 6 is an axial sectional half view of a mold in accordance with a third embodiment of the invention.

FIG. 6 shows a mold in accordance with a third embodiment of the invention. In said FIG. 6, elements analogous to those shown in FIGS. 1 to 5 are denoted by identical reference numerals.

In this third embodiment, the locking member 14M includes axial projections 62B which are circumferentially distributed, alternating with axial indentations 64B.

The wedging member 44 is in the general shape of a ring which is coaxial with the tire and includes projections 62C and indentations 64C which are complementary to the projections 62B and indentations 64B of the locking member 14M.

The locking member 14M and wedging member 44 are movable relative to each other between:

a position wherein the projections 62B and 62C of the locking member 14M and wedging member 44 are axially superimposed; and a position wherein projections 62B and 62C of the locking member 14M and wedging member 44 are fitted into the complementary indentations 64C and 64B of the wedging member 44 and locking member 14M respectively.

The principal aspects of a method of vulcanizing a green tire blank using a mold in accordance with the third embodiment of the invention will now be described.

Figure 7:
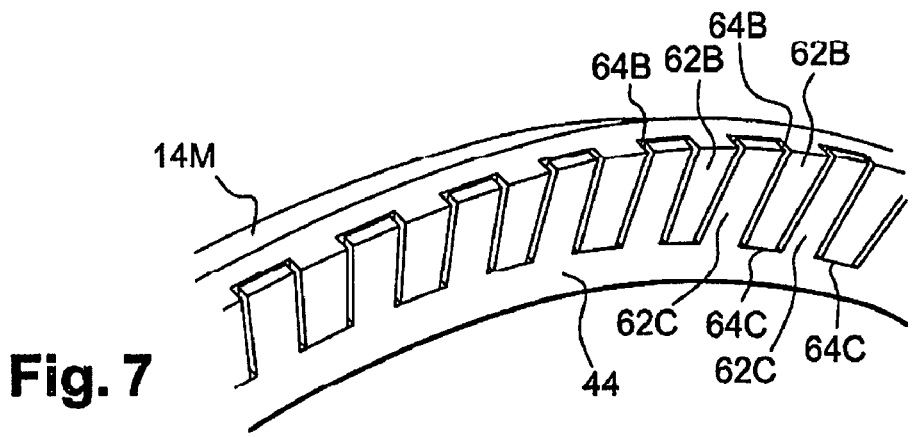
FIGS. 7 to 9 are perspective views of a portion of the locking member and wedging member of the mold of FIG. 6 at different stages of closing the mold.
Figure 8:
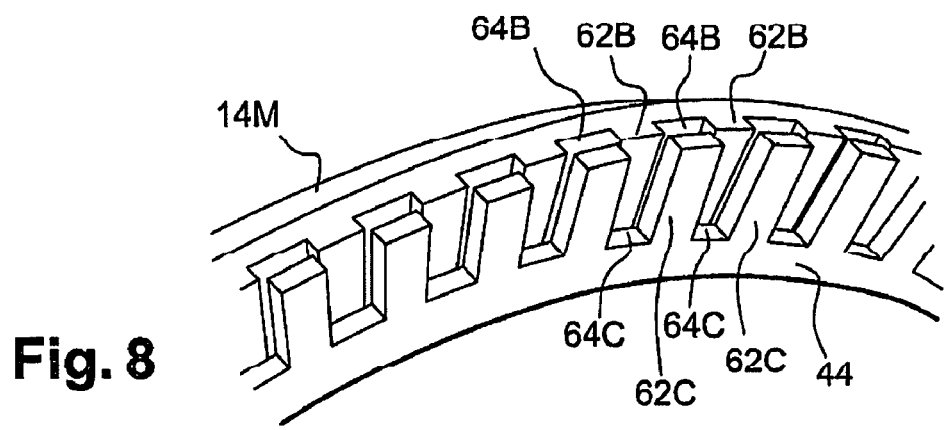

Once the green tire blank has been placed between the two axial members 14 of the mold, the locking member 14M is axially displaced from the fitting position shown in FIG. 7 towards an intermediate position in which the projections 62B and 62C are respectively axially offset relative to the indentations 64C and 62C. This intermediate position is shown in FIG. 8.

Figure 9:
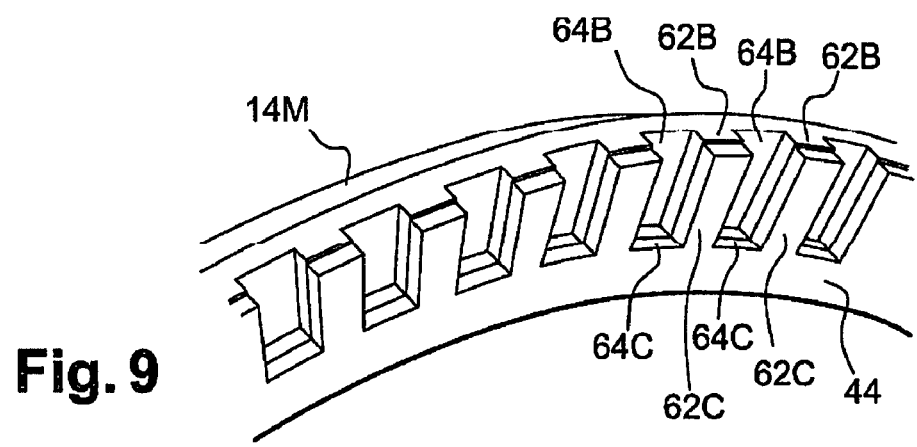

Next, the locking member 14M is pivoted relative to the wedging member 44 about the tire axis to reach the superimposed position shown in FIG. 9, corresponding to the mold closing position.

A variant of this embodiment could be to use a screw-and-nut connection between the fixed and movable portions 14F and 14M of the axial member, with displacement by tightening or loosening the screw connection including an axial component.

FIGS. 10 to 13 show a mold in accordance with a fourth embodiment of the invention. In these figures, elements analogous to those shown in FIGS. 1 to 9 are designated by identical references.

In this fourth embodiment, the movable portion 14M (locking member) of each axial member 14 of the mold is mounted to move in rotation about the axis X on the fixed portion 14F of said axial member 14.

The movable portion 14M is generally in the form of a ring mounted on the same axis as the tire 12, assuming that the tire 12 is in the mold 10. The movable portion 14M is guided in rotation relative to the fixed portion 14F in particular with the help of complementary cylindrical guide surfaces 66 and 70.

Unlike the above-described embodiments, the movable portion 14M is not designed to be displaced axially relative to the fixed portion 14F.

Figures 10, 11:
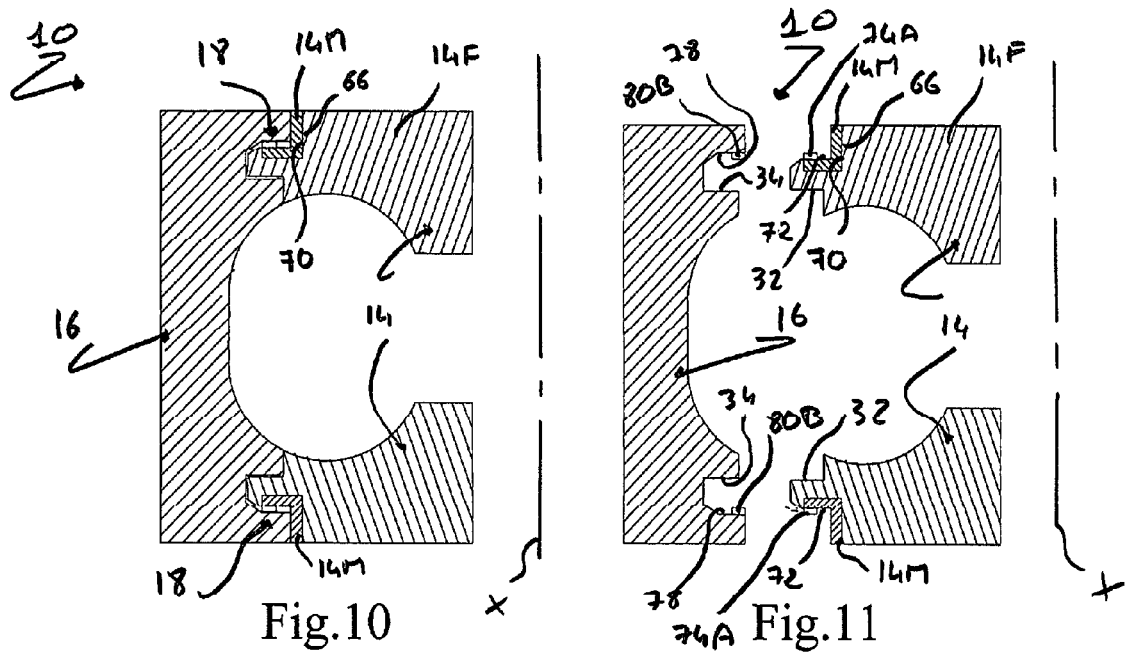
FIGS. 10 and 11 are half-views in axial section of a mold in accordance with a fourth embodiment of the invention shown respectively closed and open.
Figures 12, 13:
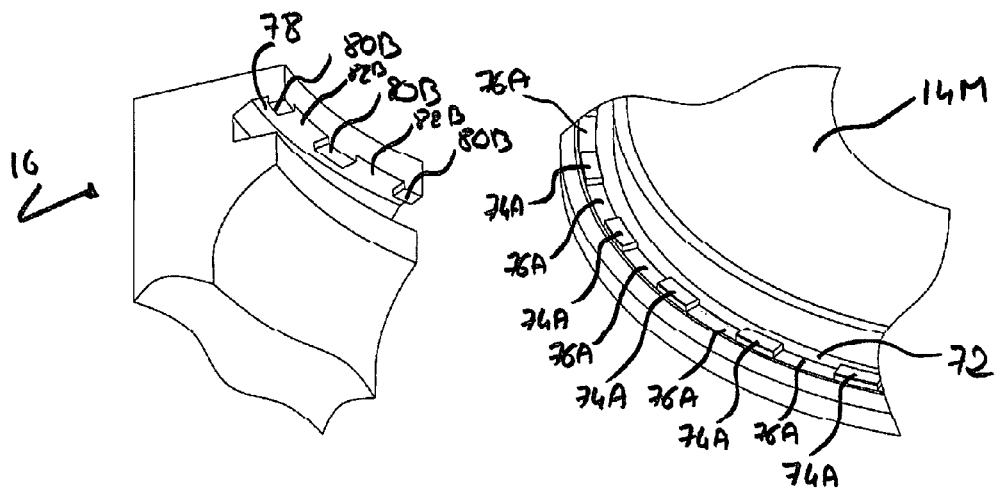
FIGS. 12 and 13 are perspective views of a portion of a radial segment and of the locking member of the mold of FIGS. 10 and 11.

In the fourth embodiment, the first radial and axial locking surfaces of the connection means 18 are formed by an annular surface 72 provided in the movable portion 14M of the axial member and provided with axial projections 74A distributed circumferentially over a radially outer portion of said annular surface 72 (see FIGS. 10, 11, and 13). These projections 74A alternate with indentations 76A.

Furthermore, the second radial and axial locking surfaces, complementary to the first locking surfaces, are formed by annular surface segments 78, each provided in a corresponding radial segment 16. Each annular surface segment 78 is provided with axial projections 80B distributed circumferentially over a radial inner portion of the segment of the annular surface 78 (see FIGS. 10, 11, and 12). These projections 80B alternate with indentations 82B.

The first locking surfaces 72, 74A carried by each axial member 14 are designed to co-operate in a bayonet type connection with the second locking surfaces 78, 80B of each radial segment 16.

By causing the movable portion 14M to turn relative to the fixed portion 14F, the first locking surfaces are displaced in rotation relative to the second locking surfaces between:

a position in which the projections 74A, 80B are mutually angularly offset, allowing these projections 74A, 80B to move radially relative to one another through the complementary indentations 76A, 82B; and a position in which the projections 74A, 80B are put into mutual radial abutment, in which the projections 74A of each movable portion 14M surround the corresponding projections 80B of the radial segments 16.

In the angularly offset position of the projections 74A, 80B, the axial members 14 can be separated from the radial segments 16 so that the mold 10 is open, as shown in FIG. 11.

In the radial abutment position of the projections 74A, 80B, the axial members 14 and the radial segments 16 are prevented from moving radially and axially relative to one another, such that the mold 10 is closed, as shown in FIG. 10.

In a manner analogous to the above-described embodiment, starting from the configuration of the mold shown in FIG. 11 (mold 10 open), in order to close the mold, the radial segments 16 are moved radially closer to the axial members 14 until the position shown in FIG. 10 is reached.

During this approach, the movable portion 14M is in its position in which the projections 74A, 80B are mutually angularly offset, thus allowing these projections 74A, 80B to be radially displaced relative to one another through the complementary indentations 76A, 82B. Furthermore, the complementary shoulders 32, 34 contribute to mutual radial guidance of the axial members 14 and the radial segments 16.

Thereafter, the movable portion 14M is caused to turn so as to be placed in its position in which the projections 74A, 80B are in radial abutment against one another, thus having the effect of locking the axial members 14 and the radial segments 16 both radially and axially.

The invention is not limited to the embodiments described above.

What is claimed is:

1. A mold for vulcanizing a tire, the mold comprising:
    at least one axial member carrying at least one sidewall molding surface for molding a sidewall of a tire;
    radial segments each carrying at least one surface for molding a tire tread;
    means for connecting the axial member with the radial segments, the connection means comprising first radial and axial locking surfaces carried by the axial member and operable to cooperate with second radial and axial locking surfaces carried by each radial segment, the first and second radial and axial locking surfaces being complementary to each other and displaceable relative to each other between an open position and a closed position of the mold;

wherein the complementary locking surfaces are separated in the open position of the mold and cooperate with each other in the closed position of the mold;

wherein the at least one sidewall molding surface is integral with a fixed portion of the axial member, the first radial and axial locking surfaces being integral with at least one locking member mounted in the axial member and being movable relative to the fixed portion;

wherein the locking member is mounted in the axial member to be axially displaceable relative to the fixed portion between the open and closed positions of the mold;

wherein the at least one axial member includes at least one wedging member of the locking member for locking the mold in the closed position; and wherein the wedging member is radially displaceably mounted in a housing provided in the fixed portion of the at least one axial member, between:

a retracted position in the housing; and a wedged position in which the wedging member is inserted between an axial surface of the fixed portion, extending said housing, and an axial end surface of the locking member.

2. The mold according to claim 1, in which the first radial and axial locking surfaces are formed by annular grooves and ribs provided in the locking member, and the second radial and axial locking surfaces are formed by annular groove segments and rib segments provided in each of the radial segments.

3. The mold according to claim 1, in which the locking member has a general form of a ring which is coaxial with the tire when the tire is in the mold.

4. A mold for vulcanizing a tire, the mold comprising:

at least one axial member carrying at least one sidewall molding surface for molding a sidewall of a tire;

radial segments each carrying at least one surface for molding a tire tread;

means for connecting the axial member with the radial segments, the connection means comprising first radial and axial locking surfaces carried by the axial member and operable to cooperate with second radial and axial locking surfaces carried by each radial segment, the first and second radial and axial locking surfaces being complementary to each other and displaceable relative to each other between an open position and a closed position of the mold;

wherein the complementary locking surfaces are separated in the open position of the mold and cooperate with each other in the closed position of the mold;

wherein the at least one sidewall molding surface is integral with a fixed portion of the axial member, the first radial and axial locking surfaces being integral with at least one locking member mounted in the axial member and being movable relative to the fixed portion;

wherein the locking member is mounted in the axial member to be axially displaceable relative to the fixed portion between the open and closed positions of the mold;

wherein the at least one axial member includes at least one wedging member of the locking member for locking the mold in the closed position; and wherein the wedging member is radially displaceably mounted on an outer axial end surface of the fixed portion of the at least one axial member, between:

a disengaged position of the locking member; and a wedging position in which the wedging member is inserted between said outer surface and an axial surface to wedge the locking member.

5. The mold according to claim 4, in which the first radial and axial locking surfaces are formed by annular grooves and ribs provided in the locking member, and the second radial and axial locking surfaces are formed by annular groove segments and rib segments provided in each of the radial segments.

6. The mold according to claim 4, in which the locking member has a general form of a ring which is coaxial with the tire when the tire is in the mold.

7. A mold for vulcanizing a tire, the mold comprising:

at least one axial member carrying at least one sidewall molding surface for molding a sidewall of a tire;

radial segments each carrying at least one surface for molding a tire tread;

means for connecting the axial member with the radial segments, the connection means comprising first radial and axial locking surfaces carried by the axial member and operable to cooperate with second radial and axial locking surfaces carried by each radial segment, the first and second radial and axial locking surfaces being complementary to each other and displaceable relative to each other between an open position and a closed position of the mold;

wherein the complementary locking surfaces are separated in the open position of the mold and cooperate with each other in the closed position of the mold;

wherein the at least one sidewall molding surface is integral with a fixed portion of the axial member, the first radial and axial locking surfaces being integral with at least one locking member mounted in the axial member and being movable relative to the fixed portion;

wherein the locking member is mounted in the axial member to be axially displaceable relative to the fixed portion between the open and closed positions of the mold;

wherein the at least one axial member includes at least one wedging member of the locking member for locking the mold in the closed position; and wherein the wedging member has a general form of a ring which is coaxial with the tire, the locking member comprising axial projections which are circumferentially distributed, alternating with axial indentations, the wedging member comprising projections and indentations which are complementary with the projections and indentations of the locking member, the locking member and the wedging member being movable relative to each other between:

a position in which the projections and of the locking member and the wedging member are axially superimposed; and a position in which the projections and of the locking member and the wedging member are fitted into complementary indentations and of the wedging member and locking member respectively.

8. The mold according to claim 7, in which the first radial and axial locking surfaces are formed by annular grooves and ribs provided in the locking member, and the second radial and axial locking surfaces are formed by annular groove segments and rib segments provided in each of the radial segments.

9. The mold according to claim 7, in which the locking member has a general form of a ring which is coaxial with the tire when the tire is in the mold.

10. A mold for vulcanizing a tire, the mold comprising:
at least one axial member carrying at least one sidewall molding surface for molding a sidewall of a tire;
radial segments each carrying at least one surface for molding a tire tread;
means for connecting the axial member with the radial segments, the connection means comprising first radial and axial locking surfaces carried by the axial member and operable to cooperate with second radial and axial locking surfaces carried by each radial segment, the first and second radial and axial locking surfaces being complementary to each other and displaceable relative to each other between an open position and a closed position of the mold;
wherein the complementary locking surfaces are separated in the open position of the mold and cooperate with each other in the closed position of the mold;
wherein the at least one sidewall molding surface is integral with a fixed portion of the axial member, the first radial and axial locking surfaces being integral with at least one locking member mounted in the axial member and being movable relative to the fixed portion;
wherein the locking member is mounted in the axial member to be axially displaceable relative to the fixed portion between the open and closed positions of the mold; and
wherein the locking member has a general form of a ring which is coaxial with the tire when the tire is in the mold.

11. The mold according to claim 10, in which the first radial and axial locking surfaces are formed by annular grooves and ribs provided in the locking member, and the second radial and axial locking surfaces are formed by annular groove segments and rib segments provided in each of the radial segments.

* * * * *